Jan. 20, 1970         M. LORY                3,491,230
        LIGHTING APPLIANCE FOR SURGICAL, MEDICAL
                 AND DENTAL APPLICATIONS
Filed Sept. 6, 1966                        4 Sheets-Sheet 1

INVENTOR

MAURICE LORY

BY Young + Thompson
        ATTYS.

Jan. 20, 1970
M. LORY
3,491,230
LIGHTING APPLIANCE FOR SURGICAL, MEDICAL AND DENTAL APPLICATIONS
Filed Sept. 6, 1966
4 Sheets-Sheet 2
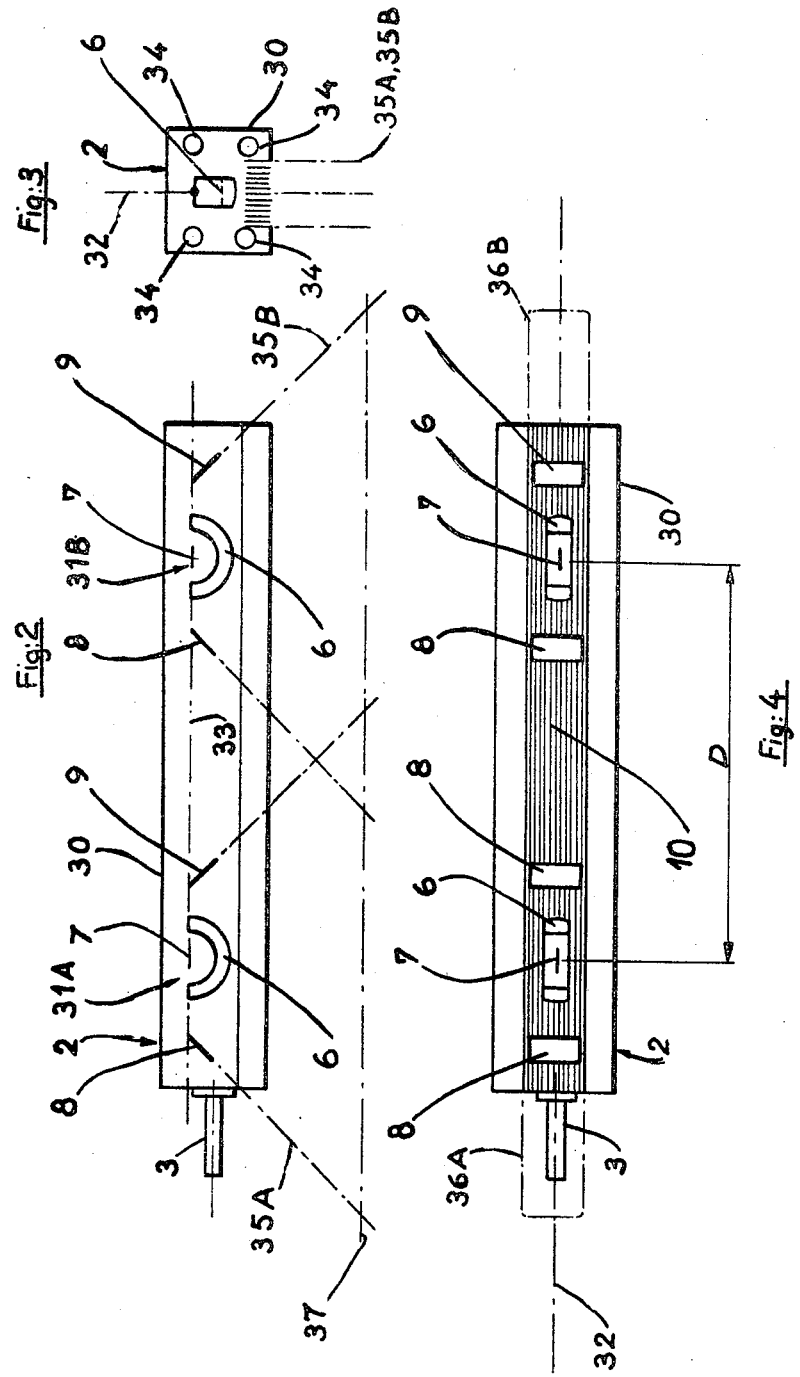
INVENTORS
MAURICE LORY
BY Young + Thompson
ATTYS.

INVENTORS
MAURICE LORY
BY Young + Thompson
ATTYS.

United States Patent Office 3,491,230
Patented Jan. 20, 1970

3,491,230
LIGHTING APPLIANCE FOR SURGICAL, MEDICAL AND DENTAL APPLICATIONS
Maurice Lory, Paris, France, assignor to Etablissements E. Quetin, Paris, France, a corporation of France
Filed Sept. 6, 1966, Ser. No. 577,269
Claims priority, application France, Sept. 7, 1965, 30,718
Int. Cl. F21v 33/00, 13/04, 5/00
U.S. Cl. 240—1.4         6 Claims

ABSTRACT OF THE DISCLOSURE

A surgical, medical or dental light comprises an elongated casing having at least two light emitters spaced apart therein along the length of the casing. Each emitter comprises a part-toroidal lens having in radial cross-section a plano-convex shape with its convex surface facing the patient and a light source positioned adjacent the focus of the lens. The sources are aligned with each other lengthwise of the casing and the meridian planes of the lenses are parallel to each other while the equatorial planes of the lenses coincide.

---

The present invention refers to an appliance for lighting in surgical, medical and especially dental applications.

Several types of appliances of this kind have already been proposed and tested for providing without undesirable shadow effects the lighting of a surgery zone. While maintaining a back ground lighting, these appliances have to enable the practitioner to direct a focussed beam exactly over the operational zone.

None of the presently known appliances seems to completely satisfy the particular requirements of dentistry. In this domain, the practitioner not only needs a precise view of the operational zone itself, but frequently has also to perform to minute and thorough manipulations at some distance from the patient, especially on the tray of the instruments, for example for the preparation of a piece of prosthesis; his view of the operational zone should not be disturbed when he more or less intercepts the light beam with his head or his body; he further encounters delicate colour problems in the choice of the shade of an artificial tooth for example.

The invention has for its object a lighting appliance capable of providing a complete solution of all these difficult problems of dentistry.

It proposes to this end an appliance for lighting an operational zone, especially in dentistry, comprising a casing and at least two light emitters arranged within said casing at a distance one from another, each of said emitters comprising a part-toroidal lens having in radial cross-section a plano-convex shape with its convex surface facing said zone and a light source positioned adjacent to the focus of said lens, said sources being aligned along a line, called the line of sources, the equatorial planes of said lenses coinciding one with another along a so-called emitting plane and the meridian planes limiting said lenses coinciding along a so-called basal plane.

With the sole refracting means constituted by the part-toroidal lenses, this arrangement offers from each emitter a beam of light which is practically confined between two planes parallel to the emission plane and thus defining an elongated and relatively narrow lighting strip.

Alignment and partial superposition of the lighting strips of the several emitters give a total or resultant lighting strip which is not only adapted to provide in its central region an appropriate lighting of an operational field, but laterally extends therefrom on both sides, thus offering both to the practitioner an to his assistant, if any, illuminated zones having a lighting which is practically equivalent in intensity and in quality to the lighting of the operational field itself. This is an extremely valuable facility for operations to be effected at one time in the operational field, at another time over a working plane situated at a distance of said field, which is quite usual in dentistry. Notwithstanding these facilities, it is possible to avoid any dazzling of the patient owing to the limitation of the width of the lighting beam.

Another object of the invention is to provide an appliance of the kind described which also provides an appropriate back ground lighting of the operational room.

Still another object is to provide a particularly easy and flexible positioning of the lighting appliance according to the nature of the work to be performed.

The appliance according to the invention especially lends itself to the use of lamps of the iodine type which give not only a powerful light but also a color which is near to that of daylight. The power of the emission and the limitation of the beams within a relatively narrow volume, although elongated in the desired direction, makes it possible and advantageous to dispose the casing of the appliance at a relatively great distance from the operational field. Under these conditions, although manual control of course remains possible, it is particularly useful to provide an automatic remote control and an important object of the invention consists in providing such an automatic positioning control by hydraulic or pneumatic means.

According to this aspect of the invention there is provided, in combination with a casing rotatably mounted around a movable shaft carried at one end of the supporting arm which is itself rotatably mounted around a fixed shaft, remote control equipment comprising a first jack for controlling the positioning in space of said supporting arm, this jack being associated with a motor-pump unit, and a second jack for controlling the angular position of said casing around said movable shaft in combination with a pressure accumulator connected to the outlet of said motor-pump unit.

This arrangement especially offers the advantage that the intervention of the motor-pump unit is practically required only for the displacements of the supporting arm, whereas the angular positioning of the casing around its own axis, which necessitates the most frequent adjustments, can be effected solely with the help of the energy accumulated in the pressure accumulator without the motor-pump unit being started. This provides an instantaneous and absolutely silent operation which is particularly appreciated from a psychological point of view for the nerves of the patient as well as for the practitioner. The pressure accumulator also absorbs the over pressure pulses produced in the hydraulic system which is directly associated with the motor-pump unit at each closure of the control valves therein.

The various objects and advantages of the invention will appear from the following description with reference to the accompanying diagrammatically simplified drawings wherein:

FIG. 2 is a general elevational view of a lighting appliance having two light emitters;

FIG. 3 is an end view of the appliance;

FIG. 4 is a plan view corresponding to FIG. 2;

Figure 1:
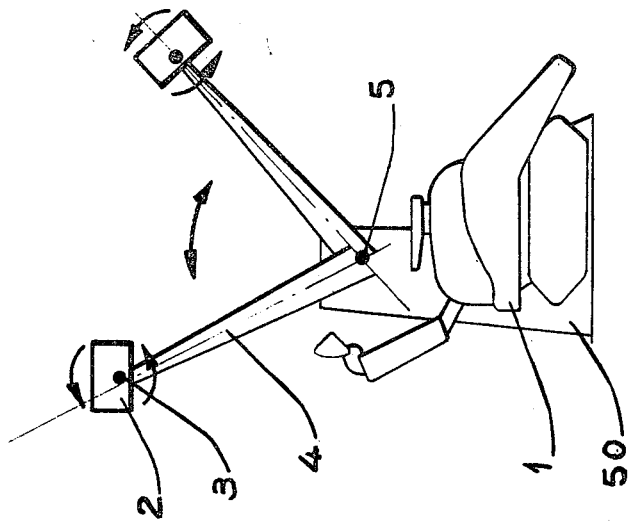
FIG. 1 is a general elevational view showing an operating chair assembly fitted with a lighting appliance according to the invention.

There is shown in FIG. 1 an operating dental chair assembly indicated by 1 and defining an operational zone towards which it is intended to direct a beam of light. Said beam is emitted by a lighting appliance 2 carried by a horizontal shaft 3 which is rotatably mounted at one end of a supporting arm 4; supporting arm 4 is rotatably mounted at its opposite end on a frame 50 by means of horizontal shaft 5.

A lighting appliance 2 is shown in some detail in FIGS. 2 to 4 and includes according to the invention a parallel-epipedic casing 30 having an elongated shape and extending in a direction parallel to rotatable shaft 3. Casing 30 is comprised by a frame having two side plates made of a translucent material and closed at its lower face by a longitudinally extending deflector consisting of a plurality of parallel thin slats 10.

According to the invention, casing 30 contains two light emitters 31A, 31B spaced one from the other along a line which is parallel to the longitudinal dimension of casing 30 and to rotating shaft 3.

Figure 5:
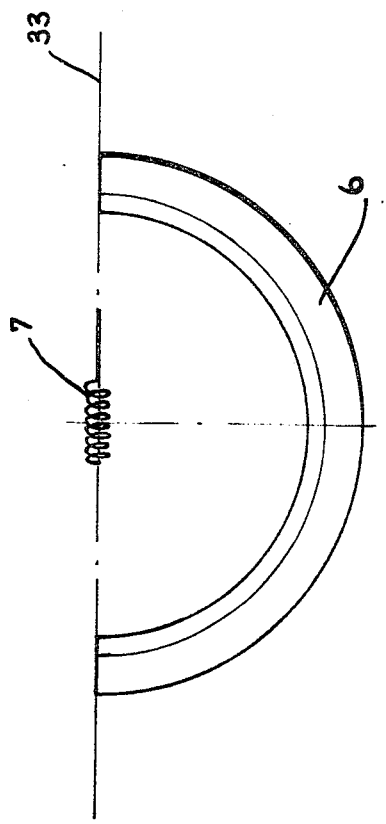
FIG. 5 is an elevational view of an emitter assembly consisting of one filament and one tore-shaped section consisting of one half of a complete tore.
Figure 6:
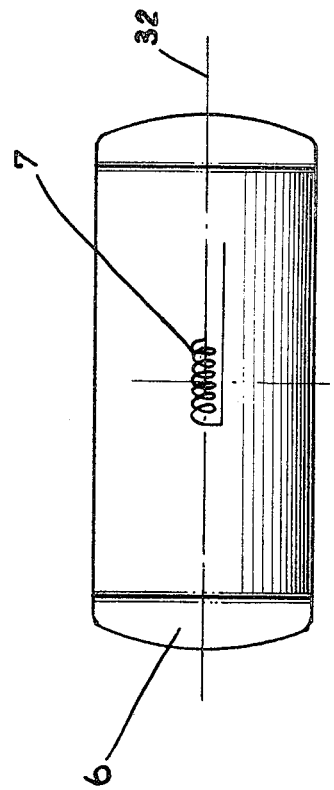
FIG. 6 shows a plan view of the same emitter.

According to the invention, emitter 31A has a light source 7, e.g. an iodine lamp positioned adjacent to the focus of a semi-toroidal lens 6, shown in FIGS. 5, 6.

As shown in this embodiment of the invention, said lens has in cross-section a plano-convex shape which is of part-toroidal shape with the axes of the tori parallel to each other and perpendicular to the length of the casing; but the lens may have a more complex optical shape, to form for instance a Fresnel lens. In either case, lens 6 has an equatorial plane 32 and is limited by a meridian plane 33, said planes being shown in the drawings by their intersection lines with planes of the relevant figure.

According to the invention, lens 6 is positioned forwardly of lamp 7 in the direction of the zone on which it is proposed to throw the light, i.e. in the emitting direction. This arrangement avoids the use of a large reflector behind the source.

Light emitter 31A may however advantageously include two small included reflectors 8, 9 positioned on either side of lens 6 along the length of casing 30. It will be noted however that according to one feature of the invention, the light beam is obtained substantially by refraction.

Light emitter 31B consists in similar members to those of light emitter 31A; the equatorial planes 32 of semi-toroidal lenses 6 coincide one with the other within a so-called emitting plane, and the meridian planes 33 of said lenses coincide one with the other within a so-called basal plane which is perpendicular to the emitting plane and parallel to the longitudinal axis of the casing. The emitting plane and the basal plane intersect each other along a so-called line of sources which is parallel to the longitudinal axis of the casing 30 and extends through sources 7.

The casing contains under cover of its translucent side plates lighting units 34 extending in a parallel direction to the longitudinal axis of casing 30 (FIG. 3), and intended to produce a background lighting.

Each emitter 31A, 31B emits a beam of light indicated respectively by 35A, 35B, said light being laterally defined by reflectors 8, 9 and being contained within a cone having a transverse cross-section very much elongated in a direction parallel to the line of sources. At the outlet from deflector 10 these beams of light have a constant dimension perpendicularly to the emission plane 32 which forms for beams 35A, 35B a principal symmetry plane as shown diagrammatically in FIG. 3.

Beyond a certain distance from casing 30 beams 35A, 35B overlap each other and their respective zones of intersection with any plane are mutually alined. There are shown in FIG. 4, the intersection zones 36A, 36B of beams 35A, 35B by a plane indicated by its intersection line 37 with the plane 37 of FIG. 2. Overlapping zones 36A, 36B form a continuous strip of light extending in a parallel direction to the line of sources and having a substantially uniform narrow width measured perpendicularly to said direction, said narrow width forming one distinctive feature of the invention.

There is thus provided a convenient mode of lighting of the operating field, said lighting extending widely on either side of said field to cover accessory installations intended for the operator and for his assistant without dazzling the patient. The dazzling effect is effectively avoided by the limitation in width of the strip of light to a width extending for instance between the nose and chin of the patient so that the eyes of the patient are exposed only to the background lighting.

Moreover, the overlapping in part of beams of light 35A, 35B ensures that if the practitioner or his assistant intercepts one of the beams of light while moving around, the operating field remains exposed to the light thrown by the other beam.

From this point of view, distance D between the two sources of light 31A, 31B is arranged advantageously to be greater than the average width of a man's body measured from shoulder to shoulder: in one embodiment of the invention, the distance D is equal to 80 cm.

It is also advantageous to provide a supporting arm 4 of ample length in order to obtain optimal overlapping of the two beams of light 35A, 35B and to provide therefore for the lighting appliance 2 a remote control arrangement in order to facilitate its handling.

Figure 7:
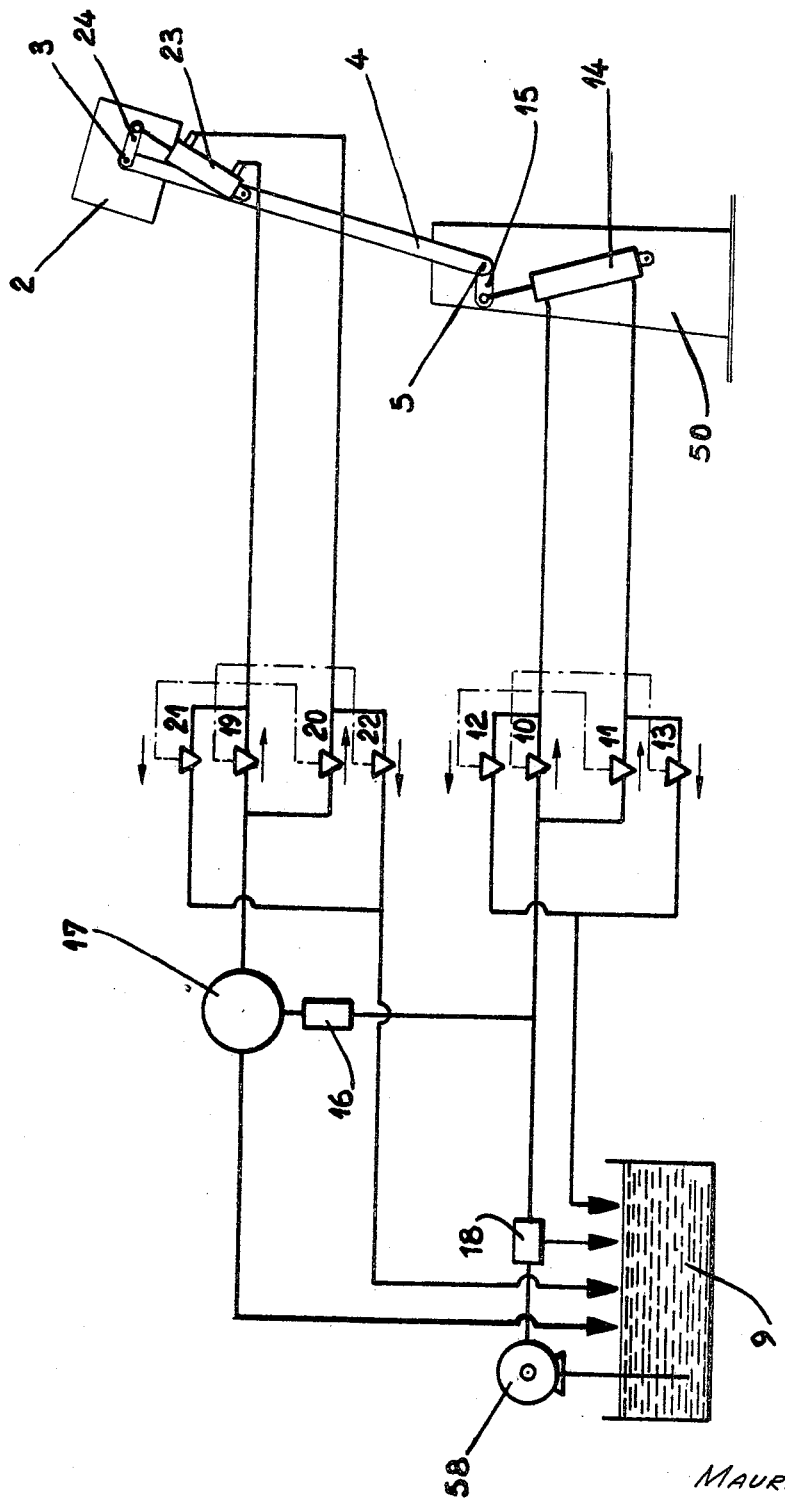
FIG. 7 is a general diagrammatical view of a hydroelectric control assembly.

There will be described hereunder with reference to FIG. 7 one such remote control device for controlling the position in space of supporting arm 4 and for the angular positioning of casing 30 around its own axis.

Frame 50 has a double acting hydraulic jack 14 having a cylinder, whose opposite ends are connected in parallel to the outlet of a motor-pump unit 58, through electro-valves 10, 11 controlled by means (not shown) to be operated by the practitioner and by a pressure limiting device 18. The motor-pump unit 58 is connected by its suction inlet to a tank 9. There is associated with each inlet electro-valve 10, 11 a return electro-valve, respectively 12, 13 by-passing electro-valves 10, 11 to allow for the fluid to return to tank 9 from one of the ends of jack 14 when fluid is admitted to said jack at its opposite end. Control means of electro-valve 13 are coupled to those of electro-valve 10 and similarly the control means of electro-valve 11 are coupled to those of electro-valve 12. The rod of jack 14 is attached to the rotating shaft 5 of supporting arm 4 by means of link 15.

Supporting arm 4 carries another double acting hydraulic jack 23 having a cylinder the ends of which are connected in parallel to a hydraulic pressure accumulator 17 through inlet electro-valves 19, 20.

Two return electro-valves 21, 22 are positioned in by-pass respectively to electro-valves 19, 20 and operate relatively to jack 23 in a similar manner to electro-valves 12, 13 relatively to jack 14.

Jack 23 is provided with a rod connected by link 24 to the rotating shaft 3 of the lighting appliance 2.

The pressure accumulator 17 is connected through a non-return valve 16 to the outlet of motor-pump unit 58 downstream of pressure limiting device 18, which protects the installation from excessive pressures, and upstream of electro-valves 10, 11.

Electro-valves 10, 11 may be operated by means of a pedal or by means of a photoelectric cell having a beam of light adapted to be intercepted by the operator or through any other suitable control means. The means of starting motor-pump unit 58 are coupled with the control means of either of electro-valves 10, 11.

Therefore, if the operator wishes to produce movement of arm 4 he actuates one or the other of electro-valves 10, 11. Motor-pump unit 58 is started simultaneously to allow the desired movement to take place and recharges at the same time the accumulator 17. The corresponding electro-valve shuts down abruptly which causes a pressure wave to appear upstream of said electro-valve and such pressure wave is recovered by accumulator 17 through non-return valve 16.

If the operator wishes to adjust lighting appliance 2, he actuates one or the other of inlet electro-valves 19, 20 and the desired movement takes place under the action of the accumulator 17 without requiring unit 58 to be started so that the system operates silently and instantaneously. The dimensions of accumulator 17 are so designed that the accumulator enables fifteen or twenty complete movements of lighting appliance 2 without requiring to be recharged i.e. without requiring motor-pump unit 58 to be started.

It is to be understood that various changes and modifications may be made in the above described lighting appliance and in the power control means thereof without deviating from the spirit or the scope of the present invention.

What I claim is:

1. Appliance for lighting an operational zone in surgical, medical and dental applications, comprising an elongated casing and at least two light emitters arranged within said casing at a distance one from another lengthwise of the casing, each of said emitters comprising a part-toroidal lens having in radial cross-section a plano-convex shape with its convex surface facing said zone and a light source positioned adjacent to the focus of said lens, said sources being aligned along a line parallel to the length of the casing, the equatorial planes of said lenses coinciding one with another and the median meridian planes of said lenses being parallel to each other, the foci of said lenses lying on a line parallel to the length of the casing.

2. Appliance according to claim 1 wherein the face of said casing confronting said zone comprises a deflector including a plurality of thin slats which are parallel to said equatorial planes.

3. Appliance according to claim 1 wherein said casing has a parallelepipedical shape and comprises two side plates made of a translucent material and, under cover of said plates, additional background light sources.

4. Appliance according to claim 1, comprising a first shaft, said casing being rotatably mounted around said first shaft, a supporting arm, said first shaft being arranged at one end of said arm, a second shaft, said arm being rotatably mounted around said second shaft.

5. Appliance according to claim 4 comprising:
a first two stroke jack having a cylinder for controlling the position in space of said supporting arm;
a motor-pump unit with a pressure outlet and a section inlet, and a tank connected with said suction inlet;
a first actuating valve connected between said pressure outlet and each of opposite ends of said cylinder;
a first return valve by-passing each said first actuating valve;
for each said first actuating valve a first control means adapted to simultaneously actuate said first actuating valve and said first return valve by-passing the other said first actuating valve;
a second two stroke jack having a second cylinder for controlling the angular position of said casing around said second shaft;
a pressure accumulator having an inlet connected to said pressure outlet of said motor-pump unit and a second outlet connected to the two opposite ends of said second cylinder;
a second actuating valve connected between each said opposite ends of said second cylinder and said second outlet;
a second return valve by-passing each said second actuating valve; and
for each said second actuating valve a second control means adapted to simultaneously actuate said second actuating valve and said second return valve by-passing the other said second actuating valve.

6. Appliance for lighting an operational zone in surgical, medical and dental applications, comprising:
an elongated casing;
at least two light emitters arranged within said casing at a distance one from another;
each of said emitters comprising a refractor of light having the shape of an arcuate sector of a body of revolution defined by rotation about a center of a surface having the shape of the cross-section of a convergent lens having one focus located substantially at said center, and a light source positioned adjacent said center;
the equatorial planes of said bodies of revolution coinciding with each other;
whereby at least two overlapping flat beams of light are produced.

References Cited

UNITED STATES PATENTS 3,287,552  11/1966  Drandell _____ 240—41.15

FOREIGN PATENTS 650,587  10/1962  Canada.

NORTON ANSHER, Primary Examiner

RICHARD M. SHEER, Assistant Examiner

U.S. Cl. X.R.

240—41.3, 106